United States Patent [19]
Sanders et al.

[11] Patent Number: 5,183,989
[45] Date of Patent: Feb. 2, 1993

[54] REDUCED HEAT INPUT KEYHOLE WELDING THROUGH IMPROVED JOINT DESIGN

[75] Inventors: John M. Sanders; Dennis D. Harwig, both of Canton, Ohio

[73] Assignee: The Babcock & Wilcox Company, New Orleans, La.

[21] Appl. No.: 716,195

[22] Filed: Jun. 17, 1991

[51] Int. Cl.$^5$ ............................................. B23K 15/00
[52] U.S. Cl. ................................. 219/121.14; 219/105
[58] Field of Search ...................... 219/121.13, 121.14, 219/121.45, 121.46, 121.63, 121.64, 101, 104, 105

[56] References Cited

U.S. PATENT DOCUMENTS

| | | | |
|---|---|---|---|
| 3,613,107 | 10/1971 | Cavagnero | 219/104 |
| 3,626,140 | 12/1971 | Peyrot | 219/121.13 |
| 4,176,270 | 11/1979 | Sailas | 219/121.14 |

OTHER PUBLICATIONS

Welding and Brazing of Carbon Steels, pp. 151–160, American Welding Society, 1968.

*Primary Examiner*—C. L. Albritton
*Attorney, Agent, or Firm*—Vytas R. Matas; Robert J. Edwards; Daniel S. Kalka

[57] ABSTRACT

An improved high energy density welding method for reducing input keyhole welding prepares the weld joint (8) between two edges (10, 14) of at least one member by separating the edges (10, 14) of the member (12, 16) with a controllable gap (22) by a projecting portion (24) selectively positioned on one edge (10, 14) of the member (12, 16). The projecting portion (24) closely abuts the other edge of the member for maintaining the controlled distance (d) of the controllable gap (22) to enhance the welding method.

5 Claims, 4 Drawing Sheets

FIG. 10-NO. 1
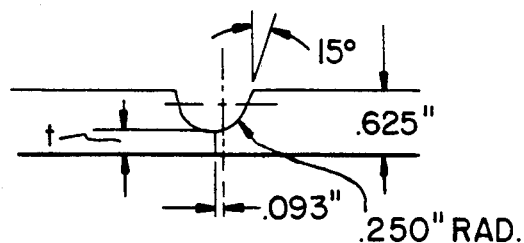
FIG. 10-NO. 2
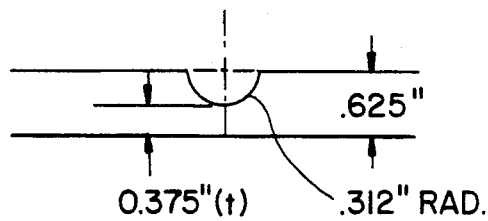
FIG. 10-NO. 3
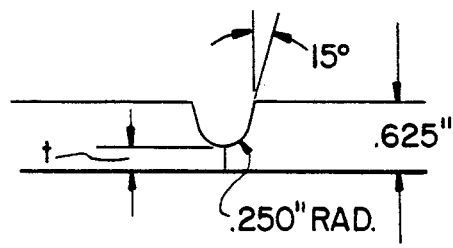
FIG. 10-NO. 4
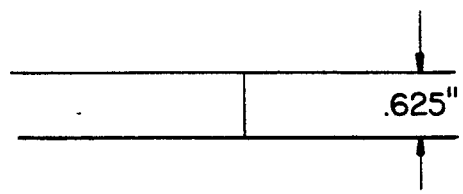
FIG. 10-NO. 5
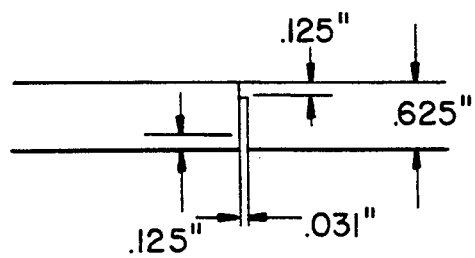

FIG. 10-NO.6
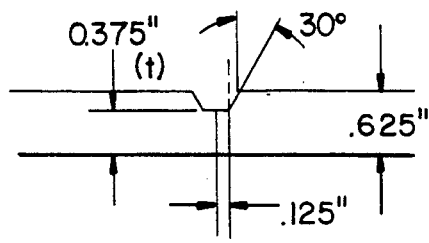
FIG. 10-NO.7
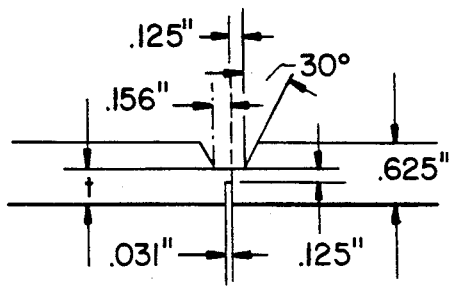
FIG. 10-NO.8
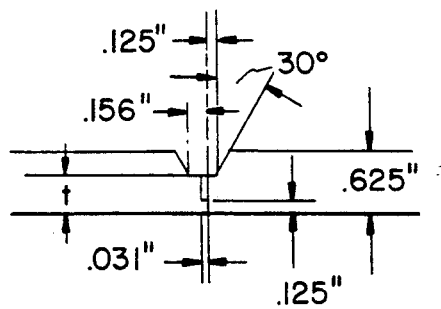
FIG. 10-NO.9
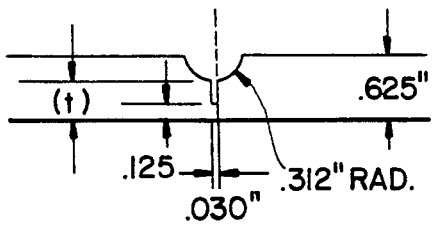
FIG. 10-NO.10
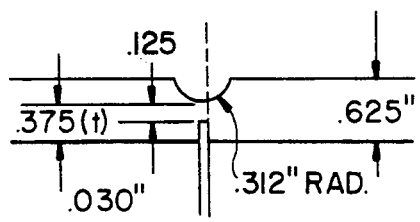

REDUCED HEAT INPUT KEYHOLE WELDING THROUGH IMPROVED JOINT DESIGN

This invention was made with Government support under Contract No. NAS-8-37800, and Subcontract Nos. WE10E3640N and 100,001 awarded by the National Aeronautics & Space Administration (NASA). The Government has certain rights in this invention.

BACKGROUND OF THE INVENTION

1. Field of the Invention

The present invention relates in general to an improved high energy density welding method, and in particular, to a new and improved high energy density welding method for keyhole welding with an improved joint design.

2. Description of the Related Art

High energy density welding is a term of art employed for three specific types of welding processes, laser welding, plasma arc welding, and electron beam welding. In these welding processes, the two members that are to be welded are tightly abutted against each other and then welded together.

It is known in the art for keyhole welding or keyhole mode welding, which is a high energy density welding process, to position a gap between the members to enhance penetration ability. Merely separating the members to be joined by a fraction of an inch facilitates the welding process. The recognized problem with this separation technique is how to control the gap as the already deposited weld metal shrinks. This closes the gap. The difficulty of maintaining the gap by using spacers, wires, shims, etc. outweighs the benefits. Tack welds can be used, but these cause local penetration problems. If the joint is tack welded intermittently to keep the gap open, the tack weld itself can break or cause penetration problems due to deposited tack weld material making the joint thicker.

Moreover, thick sectioned (greater than ¼" thick) welding requires material removal from the joint area before welding. This enables arc energy to impinge on a thinner section near the bottom of the joint to ensure penetration through the joint. This joint preparation usually requires a groove to be formed which is typically a "V" or a "U" configuration.

One reference, *Proceedings of the Electron Beam Welding Symposium*, edited by Edward R. Funk, on page 257 illustrates a step-type joint design as shown in FIG. 1. While this reference shows a gap, it describes that the purpose of the joint design is for self-aligning, self-supporting and self-fixturing. It then lists the disadvantages with this type of joint design such as difficulty to fabricate, difficulty to weld, difficulty in controlling quality, requiring a backup shield, difficulty in inspection, the provision of a gap always in the joint, and difficulty to assemble. This reference also illustrates a lip type joint on page 255 and shown in FIG. 2. The disadvantages with this weld joint include the difficulty to fabricate, the relative difficulty to weld, and the need for added material for the lip.

U.S. Pat. No. 4,639,574 discloses a method and apparatus for automatically welding together edges of sheet metal to form a sealed joint in the fabrication of duct work.

U.S. Pat. No. 4,709,604 describes a tool joint reworking device for milling exterior surfaces and refacing both shoulders of a two-shoulder tool joint.

U.S. Pat. No. 4,645,897 is directed to a method and apparatus for aligning two workpieces for butt-welding and with removal of weld upset.

Accordingly, there is a need for a high energy density welding method which provides a controlled gap so as to enhance the welding process. This welding method must provide for welding thicker sections of material with less heat input and eliminate the necessity for filling in grooves in prepared joints with multiple layers of weld material.

SUMMARY OF THE INVENTION

The present invention solves the aforementioned problems with the prior art as well as others by providing a new weld joint for high energy density welding method. The weld joint provides a controlled distance or gap between the members by utilizing a projecting portion on one edge to allow the members to be tightly abutted with the result of a controllable gap greater than or equal to about 0.030 inch for enhancing the welding process. Thus, the present invention allows for welding a thicker section of material with less heat input without the need for multiple weld layers in a prepared groove.

Alternate embodiments of the present invention allow for the formation of a prepared groove at a preselected depth in the members to be welded.

One object of the present invention is to provide a high energy density welding method with a prepared weld joint which results in a controllable gap for enhancement of a keyhole welding method.

Another object of the present invention is to provide a welding method which allows for welding thicker sections of material with less heat input.

A further object of the present invention is to eliminate the necessity of prepared joints with specific groove configurations as well as the need for filling these cavities with multiple layers of weld material.

The various features of novelty characterized in the present invention are pointed out with particularity in the claims annexed to and forming a part of this disclosure. For a better understanding of the invention, the operating advantages attained by its use, reference is made to the accompanying drawings and descriptive matter in which a preferred embodiment of the present invention is illustrated.

BRIEF DESCRIPTION OF THE DRAWINGS

In the drawings:

FIG. 10 is a composite drawing showing ten (10) joint designs with actual dimensions.

DESCRIPTION OF THE PREFERRED EMBODIMENT

Referring to the figures, where like numerals designate like or similar features throughout the several views, there are depicted various weld joints. The term "weld joints" as used herein is referring to the edges or ends of members that are to be welded together. It should be readily apparent that one member can have two ends that are to be welded for example a pipe or tube. The term "members" is meant to include these types of workpieces also. The weld joint is the location of these two ends prior to and after welding.

Figure 1:
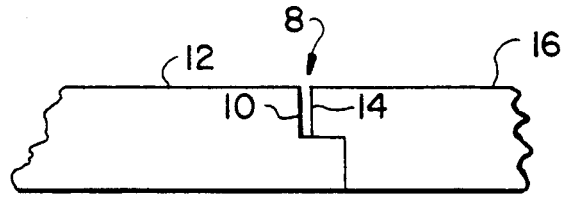
FIG. 1 is a section view of a step type joint.
Figure 2:
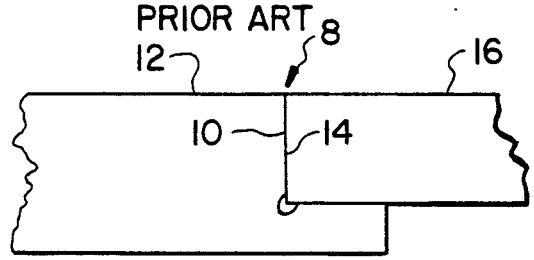
FIG. 2 is a section view of a lip type joint.

FIGS. 1 and 2 depict a step type joint and a lip joint known in the art. Both of these designs have several disadvantages including difficulty to weld and control quality.

Figure 3:
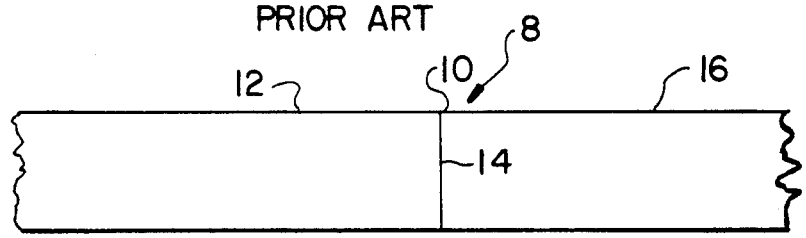
FIG. 3 is a side sectional view of a square butt joint design.

FIG. 3 shows a typical weld joint commonly employed in a keyhole mode of a high energy density welding process. One edge (10) of member (12) is tightly abutted against the other edge (14) of member (16). The weld joint (8) is then welded by laser welding, plasma arc welding, or electron beam welding.

Figure 5:
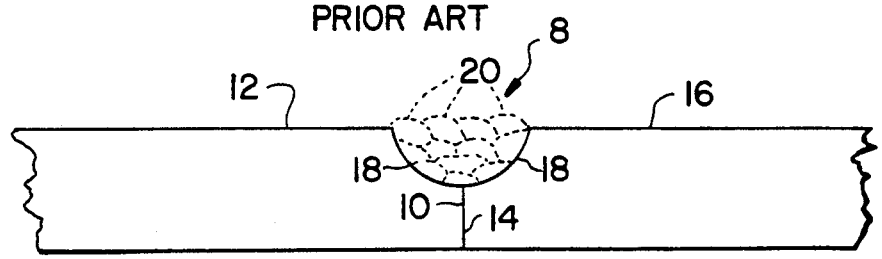
FIG. 5 is similar to FIG. 3 with a prepared "U" groove depicting weld material in phantom line.

FIG. 5 illustrates a weld joint (8) similar to FIG. 3 with a portion of each edge (10, 14) removed to form a "U" groove (18). The "U" groove (18) is necessary when welding thick pieces of materials together ($\frac{1}{4}$") so that gases from the welding torch can penetrate the material being joined. The welding torch (not depicted) is held over the "U" groove (18) and welds the edges (10, 14) of members (12, 16), respectively, in a keyhole welding mode. The term "keyhole" is known in the welding art wherein the hot gases from the torch actually melt a hole right along the edge (10, 14) with molten metal on both sides (10, 14) fusing together to form the weld. Since the keyhole welding mode is limited by the thickness of the material, the purpose of the "U" groove (18) is to facilitate penetration.

After the initial weld traverses edge (10, 14), the "U" groove (18) is then filled with weld metal as indicated by the dashed lines (20) in FIG. 3. The finished or completed weld joint (8) may then be processed to remove excess weld material in a known manner.

Figure 4:
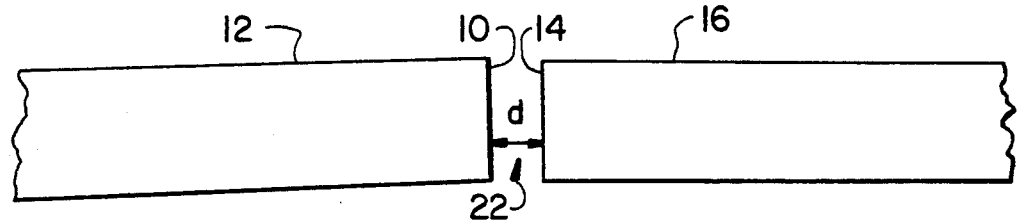
FIG. 4 is a similar view with a gap provided.

Those skilled in this art occasionally employ a gap to enhance the keyhole welding process with a weld joint as shown in FIG. 4. This gap (22) must be carefully set and controlled with additional aids such as spacers, wires, shims, etc. to set the gap (22) to a predetermined distance "d". Normally "d" equals about 1/32 inch. While it is known to employ tack welds in this alignment, these tack welds cause local penetration problems where they are located.

The present invention resides in a new weld joint design as shown in FIGS. 6-9 which automatically results in a controllable gap (22). A projecting portion (24) with predetermined dimensions on one edge (14) of a member (12) (shown in FIG. 6) produces a controllable gap (22). The projecting portion (24) has a length (1) of preferably about $\frac{1}{8}$" and typically a width of about 1/32" (0.0312 inch). Thus, a controllable gap (22) is produced with a width of about 1/32". The projecting portion (24) is readily formed by machining either edge (10, 14) of member (12, 16).

During the welding process, the torch (not shown) may be positioned on either side of the weld joint and the welding carried out in a manner known in the art. In a keyhole mode plasma welding process, a high velocity gas jet maintains a molten keyhole completely through the joint thickness. While penetration is limited by the ability of the gas jet to hold the keyhole open, the joint design in the present invention increases the penetrating ability of the jet by effectively reducing the amount of material the jet must displace to enable full joint penetration.

Figure 7:
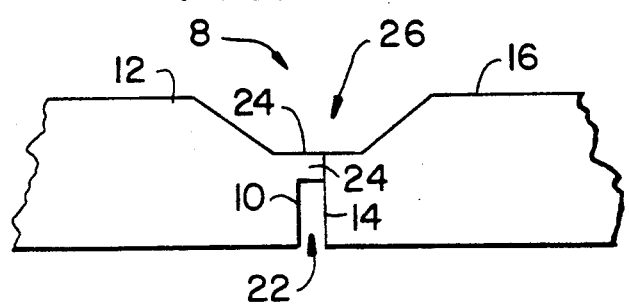
FIG. 7 is a side sectional view of another embodiment of a prepared weld joint.
Figure 8:
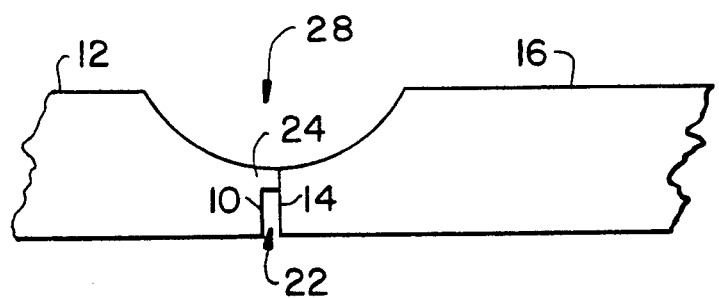
FIG. 8 is similar to FIG. 7 and depicts still another embodiment of a prepared weld joint.
Figure 9:
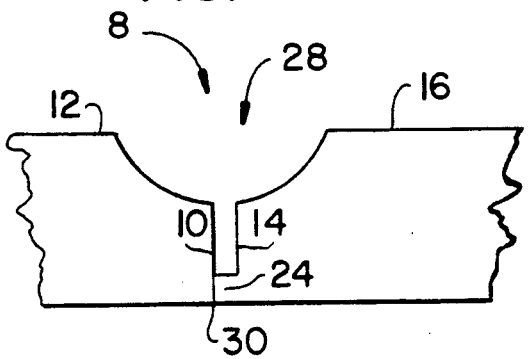
FIG. 9 is a side sectional view of yet another embodiment of a prepared weld joint in accordance with the present invention.

FIGS. 7-9 illustrate other embodiments of the weld joint design in accordance with the present invention.

Figure 6:
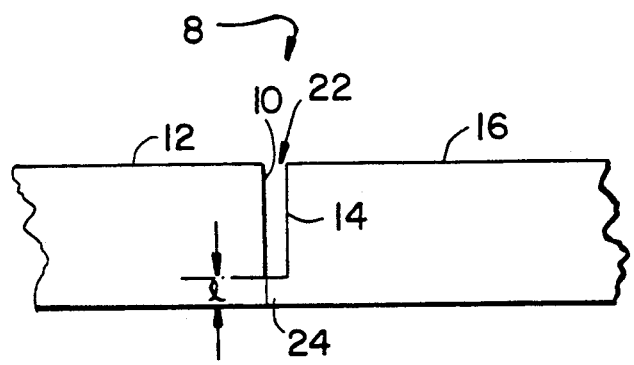
FIG. 6 is a side sectional view of a prepared weld joint in accordance with the present invention.

FIG. 7 shows a "V" groove (26) situated immediately above the projecting portion (24) with a controllable gap (22) being immediately adjacent but on the opposite side thereof. The welding process as described with respect to FIG. 6 is similar in FIG. 7 except that additional welding passes are necessary to completely fill the "V" groove using the melt in mode of welding. This allows even thicker materials (greater than $\frac{3}{8}$") to be welded.

The embodiment shown in FIG. 8 is similar to FIG. 5 except that the groove is a "U" (28).

FIG. 9 shows the "U" groove (28) situated immediately next to the slot or gap (22) with the projecting portion (24) being situated towards one side (30) of the members (12, 16).

The projecting portion (24) may be any shape or size depending on the material to be welded. The purpose of the projecting portion (24) is to tightly fit or abut an even edge of a member for welding as is illustrated in FIGS. 6-9.

The joint design of the present invention has provided the following advantages:

Deeper joint penetration is achievable for a given set of welding parameters.

Reduced heat input for a given weld joint thickness improves the metallurgical properties.

Better under bead shape control is achieved due to the reduced molten metal in a given bead.

The reduction in the number of required passes speeds production for a given thickness.

Tack welds are eliminated.

Machining and inspection costs are reduced in preparing weld joints. This step is easier to machine and inspect than a "U" or a chamfer.

Arc blow is reduced in ferromagnetic materials.

The filler wire bead is enhanced during keyhole welding.

The attached TABLE which makes reference to the joint designs in FIG. 10 details results of actual welding experiments using standard and new joint designs on a HP 9Ni-4Co-0.03C steel material.

The attached FIG. 10 is a composite drawing showing the actual joint dimensions. Note that joints 5, 7, 8, 9 and 10 contain controlled slots. From the TABLE it can be seen that three types of welds were performed: single pass square butt, 0.375" land with a "U" groove, and 0.375" land with an extended V groove. In the square butt tests (joint 5 vs. 4), the heat input was reduced by 15.2% using the slotted joint design. For the U-groove the heat input was reduced by 11.2% and 8.5% by using variations of the slotted joint. Larger reductions of 13% and 14.8% were produced in the extended V design when a supplemental slot was used. The data conclusively proves that using a controlled slot enables the plasma arc high energy density process to perform welds at a lower heat input than similar joints without a slot.

In FIG. 10, t = land thickness; (t) is the varied thickness of cut; and t = 0.375 inches (") for data in the attached TABLE.

| PREFERRED WELD PARAMETERS UNDER TEST CONDITIONS | | | | | | |
|---|---|---|---|---|---|---|
| Weld ID # | Joint Design | HI Heat Input | Plasma Gas Flow | Travel Speed | Amps | Volts |
| (.625" Thk Single Pass Welds) | | | | | | |
| 1008-1401-3-1 | #4 | 109.4 KJ/inch | 7 CFH | 4 ipm | 285A | 25.6V |
| 1008-1245-3-2 | #5 | 94.9 KJ/inch | 7 CFH | 4 ipm | 252A | 25.1V |
| | | $\Delta HI(5 Vs 4) = 15.2\%$ | | | | |
| (.375" Land, .312" Radius U-grooves) | | | | | | |
| 1022-1141-4-1 | #2 | 73.7 KJ/inch | 8 CFH | 6 ipm | 270A | 27.3V |
| 1114-0820-4-1 | #9 | 66.3 KJ/inch | 8 CFH | 6 ipm | 241A | 27.5V |
| 1114-1034-4-2 | #10 | 67.9 KJ/inch | 8 CFH | 6 ipm | 245A | 27.7V |
| | | $\Delta HI (9 Vs. 2) = 11.2\%$ | | $\Delta HI (10 Vs. 2) = 8.5\%$ | | |
| (3.75" Land, 60° included, extended V-grooves) | | | | | | |
| 1022-1103-4-2 | #6 | 76.7 KJ/inch | 8 CFH | 6 ipm | 278A | 27.6V |
| 1018-1320-4-1 | #7 | 67.9 KJ/inch | 8 CFH | 6 ipm | 258A | 26.3V |
| 1018-1440-4-1 | #8 | 66.8 KJ/inch | 8 CFH | 6 ipm | 254A | 26.3V |
| | | $\Delta HI (7 Vs. 6) = 13.0\%$ | | $\Delta HI (8 Vs. 6) = 14.8\%$ | | |

$$HI = \frac{Volts \times Amps \times 60}{Inches/Min.} \quad \Delta HI = \frac{HI_{STANDARD} - HI_{MODIFIED}}{HI_{MODIFIED}} \times 100$$

$$HI = \frac{V \times I \times 60}{TS} \quad TS = \text{Travel Speed (in/min)}$$

While specific embodiments of the present invention have been shown and described in detail to illustrate the application and principles of the invention, it is understood that it is not intended that the present invention be limited thereto and that the invention may be embodied otherwise without departing from such principles.

We claim:

1. In a keyhole welding mode of a high energy density welding process employing a high velocity gas jet to maintain a molten keyhole through a joint thickness, the improvement comprising the steps of:

providing a projecting portion having a predetermined dimension on one edge of a member; and abutting the projecting portion tightly against an even edge of another member to provide a controllable gap greater than or equal to about 0.030 inch for maintaining a controlled distance to enhance the keyhole welding mode by controlling the gap as deposited weld metal shrinks to increase penetrating ability of the jet, the controlled distance between the edges of the member being a slot defined by a predetermined width extending between the edges of the member up to the projecting portion.

2. A welding method as recited in claim 1, wherein the projecting portion has a length of about ⅛ inch and a width of about 1/32 inch.

3. A welding method as recited in claim 1, wherein one side of the member is provided with the predefined slot and the other side having a "V" groove formed adjacent the predefined slot with the projecting portion separating the "V" groove from the slot.

4. In a keyhole welding mode of a high energy density welding process employing a high velocity gas jet to maintain a molten keyhole through a joint thickness, the improvement comprising the steps of:

providing a projecting portion having a predetermined dimension on one edge of a member; and abutting the projecting portion tightly against an even edge of another member to provide a controllable gap greater than or equal to about 0.030 inch for maintaining a controlled distance to enhance the keyhole welding mode by controlling the gap as deposited weld metal shrinks to increase penetrating ability of the jet, the controlled distance between the edges of the member being a slot defined by a predetermined width extending between the edges of the member up to the projecting portion, one side of the member being provided with the predefined slot and the other side having a "U" groove formed adjacent the predefined slot with the projecting portion separating the "U" groove from the slot.

5. In a keyhole welding mode of a high energy density welding process employing a high velocity gas jet to maintain a molten keyhole through a joint thickness, the improvement comprising the steps of:

providing a projecting portion having a predetermined dimension on one edge of a member; and abutting the projecting portion tightly against an even edge of another member to provide a controllable gap greater than or equal to about 0.030 inch for maintaining a controlled distance to enhance the keyhole welding mode by controlling the gap as deposited weld metal shrinks to increase penetrating ability of the jet, the controlled distance between the edges of the member being a slot defined by a predetermined width extending between the edges of the member up to the projecting portion, the predefined slot including a "U" groove portion on one side of the member with the projecting portion being situated on the other side.

* * * * *